US005572025A

United States Patent [19]

Cotter et al.

[11] Patent Number: 5,572,025

[45] Date of Patent: Nov. 5, 1996

[54] METHOD AND APPARATUS FOR SCANNING AN ION TRAP MASS SPECTROMETER IN THE RESONANCE EJECTION MODE

[75] Inventors: Robert J. Cotter, Baltimore; Vladimir M. Doroshenko, Reisterstown, both of Md.

[73] Assignee: The Johns Hopkins University, School of Medicine, Baltimore, Md.

[21] Appl. No.: 450,464

[22] Filed: May 25, 1995

[51] Int. Cl.$^{6}$ .............................. B01D 59/44; H01J 49/00

[52] U.S. Cl. .............................................. 250/292; 250/282

[58] Field of Search .................................... 250/282, 292, 250/252.1

[56] References Cited

U.S. PATENT DOCUMENTS

| | | | |
|---|---|---|---|
| Re. 34,000 | 7/1992 | Syka et al. | 250/292 |
| 2,882,410 | 4/1959 | Brobeck | 250/41.9 |
| 2,939,952 | 6/1960 | Paul et al. | 250/41.9 |
| 3,073,951 | 1/1963 | Burdg | 250/41.9 |
| 3,590,243 | 6/1971 | Perrin et al. | 250/429.5 |
| 3,617,736 | 11/1971 | Barnett et al. | 250/41.9 |
| 3,955,084 | 5/1976 | Giffin | 250/281 |
| 4,175,234 | 11/1979 | Hunt et al. | 250/427 |
| 4,298,795 | 11/1981 | Takeuchi et al. | 250/282 |
| 4,473,748 | 9/1984 | Konagai et al. | 250/299 |
| 4,500,782 | 2/1985 | Allemann et al. | 250/252.1 |
| 4,540,884 | 9/1985 | Stafford et al. | 250/282 |
| 4,736,101 | 4/1988 | Syka et al. | 250/292 |
| 4,818,864 | 4/1989 | Allemann | 250/291 |
| 4,882,485 | 11/1989 | Duryea | 250/288 |
| 4,952,802 | 8/1990 | Duryea | 250/288 |
| 5,028,777 | 7/1991 | Frazen et al. | 250/282 |
| 5,120,957 | 6/1992 | Griffiths | 250/292 |
| 5,155,357 | 10/1992 | Hemond | 250/291 |
| 5,291,017 | 3/1994 | Wang et al. | 250/282 |
| 5,298,746 | 3/1994 | Franzen et al. | 250/292 |
| 5,304,799 | 4/1994 | Kurzweg | 250/296 |
| 5,354,988 | 10/1994 | Jullien | 250/292 |
| 5,399,857 | 3/1995 | Doroshenko et al. | 250/292 |

OTHER PUBLICATIONS

Raymond E. Kaiser,Jr. et al., *Operation of a Quadrupole Ion Trap Mass Spectrometer to Achieve High Mass/Charge Ratios*, pp. 79–115, 1991, International Journal of Mass Spectrometry and Ion Processes, vol. 106.

Frank A. Londry et al., *Enhanced Resolution in a Quadrupole Ion Trap*, pp. 43–45, 1993, Rapid Communications In Mass Spectrometry, vol. 7.

Raymond E. March, *Ion Trap Mass Spectrometry*, pp. 71–135, 1992, International Journal of Mass Spectrometry and Ion Processes, vol. 118–19.

(List continued on next page.)

*Primary Examiner*—Bruce C. Anderson

*Attorney, Agent, or Firm*—Kirk D. Houser; Eckert Seamans Cherin & Mellott

[57] ABSTRACT

A method of operation of an ion trap mass spectrometer having a ring electrode and pair of end-cap electrodes in a resonance ejection mode is disclosed. The method includes producing ions from a plurality of biomolecules, applying a trapping RF voltage to the ring electrode, applying an excitation voltage to the end-cap electrodes, scanning the trapping RF voltage in order to sequentially eject the ions, controlling a ration of the amplitude of the trapping RF voltage to the amplitude of the excitation voltage in order that the ratio is generally constant, and determining a ratio of mass to charge of the ejected ions. In one embodiment, a feedback voltage which is proportional to the trapping RF voltage is sensed, and the amplitude of the excitation voltage is controlled as a function of the amplitude of the feedback voltage. In another embodiment, a first value related to the amplitude of the trapping RF voltage and a second value, which is proportional to the first value and related to the amplitude of the excitation voltage, are determined. The amplitude of the trapping RF voltage is modulated employing the first value and the amplitude of the excitation voltage is modulated employing the second value. Preferably, the determined mass-to-charge ratio (m/z) of the ejected ions is equal to a constant (α) times the trapping RF voltage (V). Associated apparatus and method of calibration are also disclosed.

52 Claims, 9 Drawing Sheets

OTHER PUBLICATIONS

Gary J. Van Berkel et al., *Electrospray Ionization Combined with Ion Trap Mass Spectrometry,* pp. 1284–1295, Jul. 1990, Analytical Chemistry, vol. 62, No. 13.

Vladimir M. Doroshenko et al., *Matrix–assisted Laser Desorption/Ionization Inside a Quadrupole Ion–trap Detector Cell,* pp. 753–757, 1992, Rapid Communications in Mass Spectrometry, vol. 6.

K. A. Cox et al., *Quadrupole Ion Trap Mass Spectrometry: Current Applications and Future Direction for Peptide Analysis,* pp. 226–241, 1992, Biological Mass Spectrometry, vol. 21.

David M. Chambers et al., *Matrix–Assisted Laser Desorption of Biological Molecules in the Quadrupole Ion Trap Mass Spectrometer,* pp. 14–20, Jan. 1993, Analytical Chemistry, vol. 65, No. 1.

Karen Jonscher et al., *Matrix–assisted Laser Desorption of Peptides and Proteins on a Quadrupole Ion Trap Mass Spectrometer,* pp. 20–26, 1993, Rapid Communications in Mass Spectrometry, vol. 7.

Jae C. Schwartz et al., *Matrix–assisted Laser Desorption of Peptides and Proteins Using a Quadrupole Ion Trap Mass Spectrometer,* pp. 27–32, 1993, Rapid Communications in Mass Spectrometry, vol. 7.

Vladimir M. Doroshenko et al., *A New Method of Trapping Ions Produced by Matrix–assisted Laser Desorption Ionization in a Quadrupole Ion Trap,* pp. 822–827, 1993, Rapid Communications in Mass Spectrometry, vol. 7.

Vladimir M. Doroshenko et al., *High–Resolution Matrix–assisted Laser Desorption/Ionization Mass Spectrometry of Biomolecules in a Quadrupole Ion Trap,* pp. 513–518, 1994, American Institute of Physics.

Raymond E. Kaiser, Jr. et al., *Extending the Mass Range of the Quadrupole Ion Trap Using Axial Modulation,* pp. 225–229, 1989, Rapid Communications in Mass Spectrometry, vol. 3.

Douglas E. Goeringer et al., *Theory of High–Resolution Mass Spectrometry Achieved via Resonance Ejection in the Quadrupole Ion Trap,* pp. 1434–1439, Jul. 1992, Analytical Chemistry, vol. 64, No. 13.

Randall K. Julian, Jr. et al., *Large Scale Simulation of Mass Spectra Recorded with a Quadrupole Ion Trap Mass Spectrometer,* pp. 85–96, 1993, International Journal of Mass Spectrometry and Ion Processes, vol. 123.

Jon D. Williams et al., *Improved Accuracy of Mass Measurement with a Quadrupole Ion–trap Mass Spectrometer,* pp. 524–527, 1992, Rapid Communications in Mass Spectrometry, vol. 6.

H. G. Dehmelt, *Radiofrequency Spectroscopy of Stored Ions I: Storage:* pp. 53–72, 1967, Adv. At. Mol. Phys., vol. 3.

David N. Heller et al., *Laser Desorption from a Probe in the Cavity of a Quadrupole Ion Storage Mass Spectrometer,* pp. 1083–1086, May 1989, Analytical Chemistry, vol. 61, No. 10.

Ronald C. Beavis et al., *Velocity Distributions of Intact High Mass Polypeptide Molecule Ions Produced by Matrix Assisted Laser Desorption,* pp. 479–484, Jul. 1991, Chemical Physical Letters, vol. 181, No. 5.

Marc R. Chevrier et al., *TOFWARE: A Windows®–based Data Acquistion System for Time–of–Flight Mass Spectrometry,* pp. 1169–1170, 1992, The 40th ASMS Conference on Mass Spectrometry and Allied Topics.

J. P. Carrico, *Applications of Inhomogeneous Oscillatory Electric Fields in the Ion Physics,* pp. 1–65, 1972, Dyn. Mass Spectrom., vol. 3.

| n | 1 | 2 | 3 | 4 | 5 | 6 | 7 |
|---|---|---|---|---|---|---|---|
| $a_n$ | 129.1 | 292.2 | 405.3 | 462.3 | 625.3 | 738.4 | 867.5 |
| $b_n$ | 157.1 | 320.2 | 433.3 | 490.3 | 653.3 | 766.4 | 895.5 |

METHOD AND APPARATUS FOR SCANNING AN ION TRAP MASS SPECTROMETER IN THE RESONANCE EJECTION MODE

BACKGROUND OF THE INVENTION

1. Field of the Invention

The present invention relates to an improved method for operating a mass spectrometer and, more specifically, it relates to controlling a generally constant ratio of the amplitude of the trapping voltage to the amplitude of the excitation voltage of a quadrupole ion trap and, more specifically, it relates to a method for calibrating an ion trap mass spectrometer in the resonance ejection mode and, most specifically, is particularly advantageous in calibrating a quadrupole ion trap mass spectrometer using a single datum point. The invention also relates to an improved mass spectrometer apparatus operating in the resonance ejection mode and, more specifically, it relates to controlling a generally constant ratio of the amplitude of the trapping voltage to the amplitude of the excitation voltage for mass analyzing ions.

2. Description of the Prior Art

The use of mass spectrometers in determining the identity and quantity of constituent materials in a gaseous, liquid or solid specimen has long been known. Mass spectrometers or mass filters typically use the ratio of the mass of an ion to its charge, m/z, for analyzing and separating ions. The ion mass m is typically expressed in atomic mass units or Daltons (Da) and the ion charge z is the charge on the ion in terms of the number of electron charges e.

It is known, in connection with mass spectrometer systems, to analyze a specimen under vacuum through conversion of the molecules into an ionic form, separating the ions according to their m/z ratio, and permitting the ions to bombard a detector. See, generally, U.S. Pat. Nos. 2,882,410; 3,073,951; 3,590,243; 3,955,084; 4,175,234; 4,298,795; 4,473,748; and 5,155,357. See, also U.S. Pat. Nos. 4,882,485; and 4,952,802.

It is known to use an ion trap mass spectrometer (ITMS) for mass analysis of large biological molecules and for tandem mass spectral measurements to provide structural and sequential information about peptides and other biopolymers. Known ionizers contain an ionizer inlet assembly wherein the specimen to be analyzed is received, a high vacuum chamber which cooperates with the ionizer inlet assembly, and an analyzer assembly which is disposed within the high vacuum chamber and is adapted to receive ions from the ionizer. Detector means are employed in making a determination as to the constituent components of the specimen employing the mass-to-charge ratio as a distinguishing characteristic. By one of a variety of known methods, such as electron impact (EI), the molecules of the gaseous specimen contained in the ionizer are converted into ions for subsequent analysis.

It is also known to use desorption methods for ionizing large molecules. Such methods include secondary ion mass spectrometry, fast-atom bombardment, electrospray ionization (ESI) in which ions are evaporated from solutions, laser desorption, and matrix-assisted laser desorption/ionization (MALDI). In the MALDI desorption method, biomolecules to be analyzed are recrystallized in a solid matrix of a low mass chromophore. Following absorption of the laser radiation by the matrix, ionization of the analyte molecules occurs as a result of desorption and subsequent charge exchange processes. See Doroshenko, V. M. et al., "High-Resolution Matrix-Assisted Laser Desorption/Ionization Mass Spectrometry of Biomolecules in a Quadrupole Ion Trap," *Laser Ablation: Mechanisms and Applications—II, Second International Conference*, pp. 513–18, American Institute of Physics (1993).

Known mass analyzers come in a variety of types, including magnetic field (B), combined electrical and magnetic field or double-focusing instruments (EB and BE), quadrupole electric field (Q), and time-of-flight (TOF) analyzers. In addition, two or more analyzers may be combined in a single instrument to produce tandem (MS/MS or MS/MS/MS, for example) or hybrid mass spectrometers such as, for example, triple analyzers (EBE), four sector mass spectrometers (EBEB or BEEB), triple quadrupoles (QqQ) and other hybrids (e.g., EBqQ). Such known tandem and hybrid instruments require the use of additional mass analyzers. For example, in a triple quadrupole, a first quadrupole is used as a mass filter to select ions of a given mass, a second quadrupole is used as a collision chamber for fragmenting the selected ions, and a third quadrupole is used for mass analyzing the fragmented ions.

Ion traps are capable of storing one or more kinds of ions for relatively long periods of time. In contrast to the tandem and hybrid instruments, the ion trap separates successive reaction steps in time rather than in space.

A known design of a quadrupole ion trap mass spectrometer consists of a central, hyperbolic cross-section, ring electrode located between two hyperbolic end-cap electrodes. In the known EI ionization method, ions are trapped and confined inside the ion trap cell by applying a radio frequency (RF) voltage on the ring electrode with the end-cap electrodes grounded. Ions of different m/z ratios are trapped simultaneously. It is known to determine the mass range of the trapped ions by an ion stability diagram, such as the one shown in FIG. 1, using the dimensionless Mathieu parameters ($a_z$ and $q_z$) which depend upon the radius of the trap ($r_o$), the direct current (DC) voltage (U) and RF voltage (V) amplitudes, and the RF frequency ($F=\Omega/2\pi$).

In the known mass selective instability operating mode, ions move along the $q_z$ axis (with $U=q_z=0$ from the left to the right in FIG. 1) with increasing RF voltage V amplitude. Ions of increasingly higher mass arrive at the stability border in succession, exit the trap in the z (axial) direction, and are detected by a multiplier located behind one of the end-cap electrodes. In this mode, ions become unstable in the strong RF trapping field.

A known technique for extending the mass range of the quadrupole ion trap is the axial resonant ejection operating mode or resonance ejection mode. A bipolar, supplementary, low amplitude RF excitation voltage is applied to the end-cap electrodes. Ions are excited and ejected from the quadrupole ion trap with the use of a supplementary, weak dipole resonant electric field. In this mode, ions are selected for ejection along the $q_z$ axis lying within the stability diagram of FIG. 1 by the applied supplementary RF field across the end-cap electrodes. A wide range of masses may be ejected by using an appropriate choice of the frequency of the excitation voltage. See, generally, U.S. Pat. No. Re. 34,000.

An equilibrium condition of the amplitude of ion oscillation occurs whenever the power gained by the ion oscillator from the excitation field is equal to the power lost in the collisions with a buffer gas. If absorption takes place at the wing of the absorption contour, then the amplitude A of the ion oscillatory motion is determined by Equation 1:

$$A = \frac{F_s}{2m\omega_s\sqrt{\frac{1}{\tau^2} + a^2t^2}} \quad \text{(Eq. 1)}$$

wherein:

$F_s = zev_s/2^{1/2}f_o$ is excitation force z is ion charge e is electron charge $v_s$ is excitation voltage amplitude $r_o$ is radius of the ring electrode m is ion mass $\omega_s = 2\pi f_s$ is excitation voltage frequency $f_s$ is excitation voltage frequency $\tau$ is effective time between ion-neutral collisions describing damping of the ion oscillator $a = d\omega/dt$ is secular frequency scan rate $\omega$ is secular frequency of ion oscillation t is time with t=0 corresponding to $\omega = \omega_s$ Equation 1 is valid whenever the secular frequency is scanned linearly (i.e., $\Delta\omega = \omega_s - \omega = -at >> 1/\tau$) or whenever the secular frequency scan rate is relatively low (i.e., $a^{1/2}\tau << 1$).

Kaiser, R. E., Jr. et at., "Operation of a Quadrupole Ion Trap Mass Spectrometer to Achieve High Mass/Charge Ratios", International Journal of Mass Spectrometry and Ion Processes, 106 (1991) 79–115, discloses the possibility of using amplitude modulation by the excitation voltage for the extension of the mass range. Because the process of resonance excitation takes some time and the ion oscillator has a finite frequency range for excitation, the free oscillation frequency of ions at the time of ejection does not correspond to the excitation frequency. This results in an apparent mass shift with respect to the ideal situation in which the secular oscillation and excitation frequencies coincide at the ejection time. As shown in FIG. 21 of Kaiser, Jr. et at., as the amplitude of the axial modulation voltage is varied, the shift in mass becomes more pronounced. The dependence of the mass shift upon the excitation voltage amplitude is not completely linear. At lower masses, there is a larger absolute mass shift and, alternatively, at higher masses, there is a smaller mass shift. Above a certain threshold, the mass shift is approximately linear, but not proportional, with increasing axial modulation voltage.

When using axial modulation for mass range extension, a substantial mass shift, which is a function of the frequency and amplitude of the supplementary voltage, is observed. In order to achieve a linear calibration for a mass spectrum, the apparent mass shift of an ion must be independent of the chosen mass range (e.g., 0–70,000 Da). As shown in FIG. 22 of Kaiser, Jr. et al., a linear relationship is observed between the apparent mass shift and the mass of the ion at high mass scan rates and constant amplitude of the excitation voltage. By ramping the excitation voltage linearly with the RF trapping scan, a constant mass shift with respect to the ion mass can be achieved if relatively large amplitudes of the excitation voltage are used.

It has been known with prior art ion cyclotron resonance spectrometers to provide a frequency of a trapping RF voltage which is twice as high as the resonance frequency of the trapping oscillation of charged particles. See, generally, U.S. Pat. No. 4,818,864.

It has been known with prior art cycloidal mass spectrometers to use a single fixed collector and a ramped electric field in looking at only one mass-to-charge ratio at a time. See, generally, U.S. Pat. No. 5,304,799.

It has been known with prior art quadrupole mass filters to apply an excitation voltage having both a DC component (U) and an AC component (V) to four primary electrodes and to provide a DC voltage (–U'), which is directly proportional to the DC component (U), between a guard electrode and an intermediate electrode. See, generally, U.S. Pat. No. 3,617,736.

It has also been known with prior art quadrupole mass filters, which transmit particles having a selected mass-to-charge ratio, to provide a power supply which maintains a constant ratio of the amplitude of the DC potential applied to four elongate filter electrodes to the amplitude of the RF potential applied to such electrodes. See, generally, U.S. Pat. No. 5,354,988.

It has been known with prior art ion trap mass spectrometers to vary the amplitude, frequency or direct potential of the trapping RF voltage. See, generally, U.S. Pat. No. 5,028,777.

It has also been known with prior art ion trap mass spectrometers to set the amplitude of the excitation voltage proportional to the square root of the amplitude of a storage (trapping) RF voltage. See, generally, U.S. Pat. No. 5,298,746.

Known mass spectrometers operating in the resonance ejection mode attempt to achieve linear mass calibration over specific mass ranges but do not provide a mass calibration which is independent of the mass scan range. In a prior publication concerning known mass spectrometers, it has been suggested that the amplitude of the excitation voltage be scanned linearly, but not directly proportional, to the amplitude of the trapping RF voltage.

Known methods of calibration in the resonance ejection mode include the external and internal calibration methods. In the external method, calibration curves are generated using well known calibrant masses before the experiment in which the unknown substances are analyzed. See, for example, Kaiser, Jr. et at. In the internal method, the calibrant and analyte ions are recorded simultaneously in the same experiment. This method achieves a better mass assignment accuracy than the external method because all ions are in the same environmental conditions. See, for example, Williams, J. D. et at., "Improved Accuracy of Mass Measurement with a Quadrupole Ion-Trap Mass Spectrometer", *Rapid Communications in Mass Spectrometry,* 6 (1992) 524–27.

Because the known dependence of the mass shift upon the excitation voltage amplitude is not completely linear, linear modulation of the excitation voltage cannot compensate for the mass shift due to changing mass. Furthermore, because the calibration curve is not completely linear, both the external and internal calibration methods require plural calibration compounds which produce a series of calibrant peaks repeated by small intervals in order to provide good accuracy. The optimum value of the excitation voltage is usually determined by the requirements for sensitivity and/or mass resolution. Because the optimum excitation voltage usually increases with mass, a new calibration is typically necessary for every mass subregion.

For these reasons, there remains a very real and substantial need for an improved mass spectrometer and calibration method therefor. In particular, there is a very real and substantial need for an internal calibration method for the ESI and MALDI ionization methods, which are typically applied to biomolecules having widely disparate m/z peaks, where simultaneous generation of analyte and calibrant ions is known to be a difficult task.

SUMMARY OF THE INVENTION

The present invention has met this need by providing an improved method of operation of an ion trap mass spectrometer having a ring electrode and a pair of end-cap electrodes in a resonance ejection mode. This method includes producing ions from a plurality of atoms or molecules, applying a trapping voltage to the ring electrode, applying an excitation voltage to the pair of end-cap electrodes, scanning the trapping voltage in order to sequentially eject the ions, controlling a ratio of the amplitude of the trapping voltage to the amplitude of the excitation voltage in order that the ratio is generally constant, and determining a ratio of mass to charge of the ejected ions.

The calibration method of the present invention provides for calibrating an ion trap mass spectrometer for operation in a resonance ejection mode, with the mass spectrometer having a trapping voltage associated therewith for sequentially ejecting ions of a plurality of atoms or molecules. This method includes performing mass spectrum measurements on a plurality of ions having a known mass in order to provide a single datum point associated therewith, with the single datum point being representative of a ratio of a trapping voltage associated with the ions having the known mass and a mass-to-charge ratio of the ions having the known mass, and defining a calibration line which converges near a reference point where the mass-to-charge ratio and the trapping voltage of the mass spectrometer are both equal to about zero, and calibrating the mass spectrometer employing the single datum point.

The present invention also provides an ion trap mass spectrometer apparatus for operation in a resonance ejection mode including ionizing means for producing ions from a plurality of atoms or molecules, separating means for separating the produced ions according to a ratio of mass to charge thereof, with the separating means including a ring electrode and a pair of end-cap electrodes, applying means for applying a first voltage to the ring electrode and for applying a second voltage to the end-cap electrodes, with a ratio of the amplitude of the first voltage to the amplitude of the second voltage being generally constant, and determining means for determining the mass-to-charge ratio of at least some of the separated ions.

A number of preferred refinements include sensing a feedback voltage which is proportional to the trapping voltage, and controlling the amplitude of the excitation voltage as a function of the amplitude of the feedback voltage. Another preferred refinement is determining a first value related to the amplitude of the trapping voltage, determining a second value related to the amplitude of the excitation voltage, with the second value being proportional to the first value, modulating the amplitude of the trapping voltage employing the first value, and modulating the amplitude of the excitation voltage employing the second value.

Preferably, the mass-to-charge ratio (m/z) of the ejected ions is equal to a constant (α) times the trapping RF voltage (V). Also, it is preferred to ramp the amplitude of the trapping RF voltage (V) and the amplitude of the excitation voltage ($v_s$) in order that their ratio is generally constant during excitation and ejection of the ions.

It is an object of the present invention to provide an improved method of operating a conventional mass spectrometer apparatus by controlling the trapping RF field and using the associated feedback to modulate the excitation voltage amplitude.

It is also an object of the present invention to provide an internal calibration method which uses a single calibrant mass.

It is a further object of the present invention to provide an external calibration method which uses a single calibrant mass.

It is a still further object of the present invention to provide an improved calibration method using biological molecules.

It is yet a further object of the present invention to provide an improved mass spectrometer apparatus for analyzing biological molecules.

It is another further object of the present invention to provide an improved mass spectrometer apparatus for analyzing ions of biological molecules produced by MALDI desorption.

It is further object of the present invention to provide a mass spectrometer apparatus in which mass calibration is generally independent of the mass scan rate.

These and other objects of the invention will be more fully understood from the following detailed description of the invention on reference to the illustrations appended hereto.

DESCRIPTION OF THE PREFERRED EMBODIMENTS

As employed herein, the term "ions" shall expressly include, but not be limited to electrically charged particles formed from either atoms or molecules by extraction or attachment of electrons, protons or other charged species.

As employed herein, the term "manipulating" shall expressly include, but not be limited to ion storing, ion isolation, monitoring ion-molecule reactions, ion dissociation, and mass analyzing.

Figure 2:
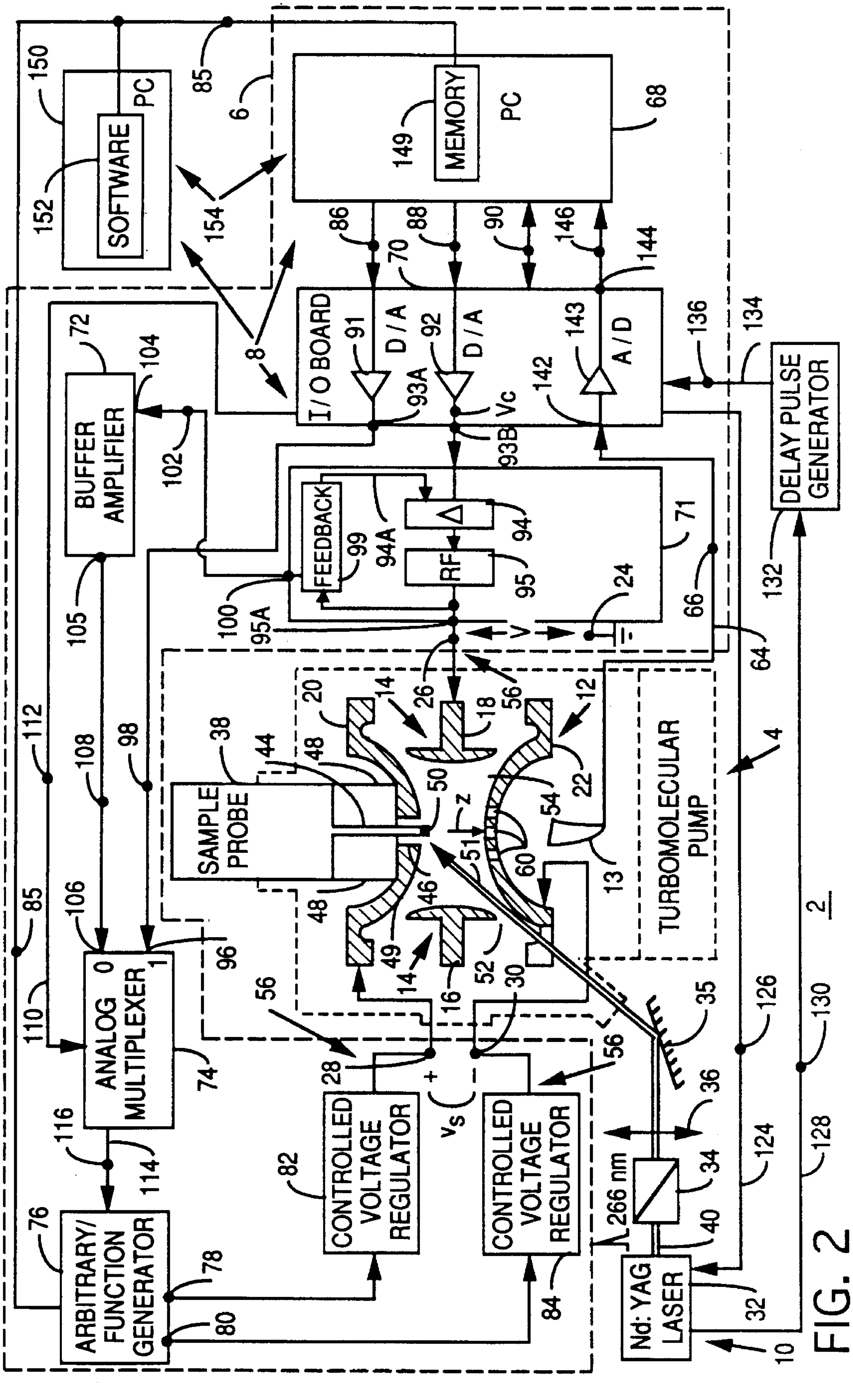
FIG. 2 is a block diagram of an ion trap mass spectrometer and associated system employable in the practice of the present invention.

FIG. 2 shows a block diagram of a quadrupole ion trap mass spectrometer system 2. The system 2 includes an ion trap mass spectrometer (ITMS) 4 which is configured for operation in the resonance ejection mode. The system 2 also includes a control sub-system 6 and an associated data acquisition sub-system 8. The system 2 further includes an ionizing mechanism 10 which produces ions from a plurality of neutral atoms or molecules. The ITMS 4 includes a quadrupole ion trap 12 for trapping and manipulating ions according to their m/z ratio, and a detector 13 such as, for example, a secondary emission multiplier for detecting ions. The exemplary ITMS 4 is a Finnigan MAT ion trap detector (ITD) which is modified, in part, for matrix-assisted laser desorption/ionization (MALDI) inside the quadrupole ion trap 12 using the sub-systems 6,8 and the ionizing mechanism 10, although the invention is applicable to other types of ion traps marketed by other vendors which are used alone or in combination with gas chromatography, liquid chromatography or electrophoresis, as well as other types of ion generators such as, for example, electron impact and ion electrospray.

The quadrupole ion trap 12 includes a central, hyperbolic cross-section, electrode 14 having two halves 16,18 (as shown in cross-section) which form a continuous ring. The ring electrode 14 is located between two hyperbolic end-cap electrodes 20,22. The control sub-system 6 applies a trapping RF voltage V (e.g., about 1.1 MHz at up to about 7,500 volts), with respect to a ground reference 24 for the system 2, to a line 26 which is connected to the half 18 of the ring electrode 14. In the resonance ejection mode of operation of the ITMS 4, the control sub-system 6 also applies a low amplitude bipolar RF excitation voltage $v_s$(e.g., about 0–550 kHz at about 0–10 volts) between lines 28,30 which are electrically connected to the end-cap electrodes 20,22, respectively. The end-cap electrodes 20,22 of the exemplary ITMS 4 are isolated from the ground reference 24.

The ionizing mechanism 10 in the form illustrated includes a laser 32, an attenuator 34, a mirror 35, a lens 36 and a sample probe 38, although the invention is applicable to a wide variety of ion generators such as, for example, MALDI outside of the ion trap 12 with subsequent ion introduction into the cavity 54 thereof, electrospray ionization (ESI), and electron impact ionization. In a preferred practice of the invention, MALDI ions are produced by desorption using a fourth harmonic (266 nm), laser beam pulse 40 of 10 ns duration from the exemplary Quantel International model YG660-10 Q-switched Nd:YAG laser 32. The laser beam 40 is attenuated by the exemplary Newport model 935-5 attenuator 34, focused by the exemplary 50 cm focal length UV quartz lens 36, and delivered onto the sample probe 38 using the mirror 35.

The sample probe 38 includes a probe tip 44 which is centered within a hole 46 of the upper end-cap electrode 20 by a teflon spacer 48 which electrically isolates the probe tip 44 from the electrode 20. The probe tip 44 is generally flush with the inside surface 49 of the electrode 20.

A sample 50, for either calibration or analysis, may be prepared as follows. A nicotinic acid matrix, prepared as a 0.1M solution in 4:1 water:acetonitrile, is mixed in equal volume amounts with a 0.0005M aqueous analyte solution. Approximately 1 μl of this mixture is deposited on the probe tip 44 to obtain several hundred single-shot spectra. The sample 50 on the tip 44 is illuminated by the focused laser beam 51 through the gap 52 between the ring electrode 14 and the lower end-cap electrode 22. The resulting MALDI ions (not shown) which are produced by the beam 51 are trapped within the cavity 54 of the ITMS 4 by the trapping RF voltage V.

The control sub-system 6 includes a voltage application circuit 56 which applies the trapping RF voltage V on line 26 to the ring electrode 14 and the excitation voltage $v_s$ between lines 28,30 to the respective end-cap electrodes 20,22. The control sub-system 6 scans the trapping RF voltage V in order to sequentially eject the ions in the cavity 54 of the ITMS 4 and, also, controls the excitation voltage $v_s$ in order to, inter alia, excite the ions. As explained in greater detail hereinafter with reference to FIGS. 4–5, in a preferred practice of the invention, the control sub-system 6 controls a ratio of the amplitude of the trapping RF voltage V to the amplitude of the excitation voltage $v_s$ in order that the ratio is generally constant.

As will be understood by those skilled in the art, the quadrupole ion trap 12 ejects the trapped ions according to a ratio of mass to charge (m/z) thereof along a z axis through perforation holes 60 in the central part of the lower end-cap electrode 22 with the use of a weak dipole electric field produced by the excitation voltage $v_s$. The ejected ions bombard the detector 13 which provides a corresponding ion signal 64 on line 66.

The control sub-system 6 further includes a personal computer (PC) 68, a multi-function input/output (I/O) board 70 associated therewith such as a Lab-PC+ board marketed by National Instruments, a trapping RF voltage generator 71 such as the analog board of the exemplary ITMS 4, a buffer amplifier 72, an analog multiplexer 74, and an arbitrary/function generator 76 having two outputs 78,80 which are respectively connected to controlled voltage regulators 82,84. In turn, the regulators 82,84 are connected to the lines 28,30 and, hence, to the end-cap electrodes 20,22, respectively. The exemplary Wavetek model 95 arbitrary/function generator 76, operating as a synthesized function generator, is programmable by the PC 68 over an instrument bus (GPIB) 85. The function generator 76 provides a suitable bipolar excitation voltage $v_s$ with a sinusoidal excitation frequency $f_s$ to the voltage regulators 82,84 which, in turn, control the selected amplitude of the excitation voltage $v_s$ at the same magnitude (i.e., $+v_s/2,-v_s/2$) with changes in the corresponding current (e.g., ±0.4 A) to the end-cap electrodes 20,22, respectively.

The exemplary I/O board 70 is plug-in connected to the PC 68 which communicates plural output signals 86,88 and other digital input/output signals 90 thereto. The I/O board 70 has two 12-bit resolution digital to analog (D/A) converters 91,92 which provide two analog outputs 93A,93B from the digital values of the output signals 86,88, respectively, of the PC 68. The analog output 93B of one D/A 92 drives an error amplifier 94 of the trapping RF voltage generator 71 which compares a feedback voltage 94A with a control voltage $V_c$ from the analog output 93B. The error amplifier 94, in turn, modulates the trapping RF voltage V on the output 95A of the RF voltage amplifier 95 for the ring electrode 14. The analog output 93A of the other D/A 91 is connected to an input 96 of the multiplexer 74 on line 98.

A feedback circuit 99 senses the trapping RF voltage V and generates an analog output 100 and the feedback voltage 94A therefrom. The amplitude of the output 100 and the feedback voltage 94A are proportional to the amplitude of the trapping RF voltage V. The output 100 is connected by a line 102 to the input 104 of the buffer amplifier 72. The output 105 of the buffer amplifier 72 is connected to another input 106 of the multiplexer 74 on line 108. The multiplexer 74 is controlled by the PC 68 using a multiplexer control signal 110 from the I/O board 70 on line 112. The signal 110 selects one of the inputs 96, 106 of the multiplexer 74 for use in presenting a modulation signal 114 to the generator 76 on line 116. The arbitrary/function generator 76 is programmed by the PC 68 to operate in a suppressed carrier modulation mode in which the amplitude of the bipolar output sinusoidal waveform voltage on the outputs 78,80 thereof is proportional to the external modulation signal 114.

Figure 4:
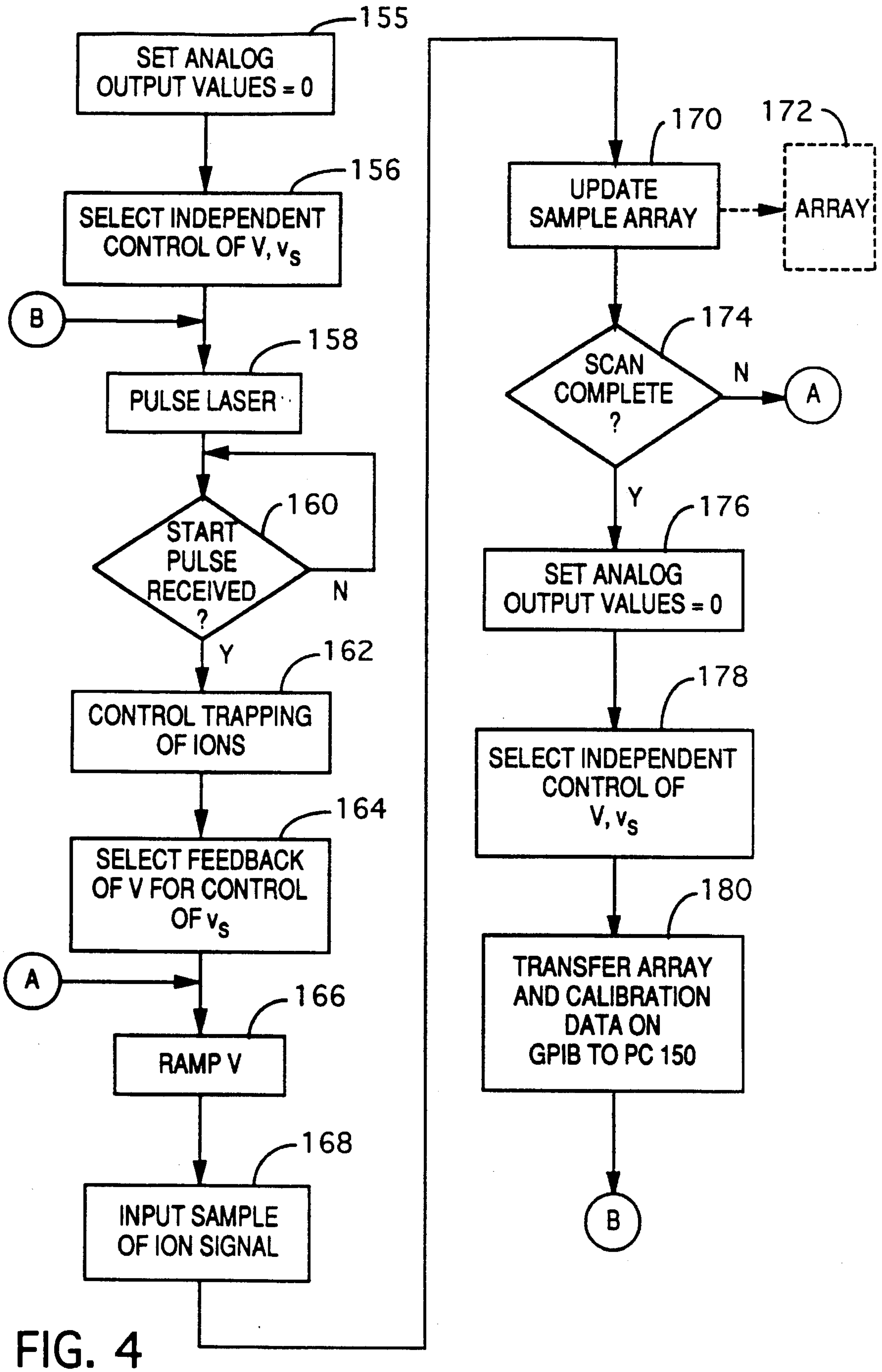
FIGS. 4 is a logic diagram showing a method of operating the ion trap mass spectrometer of FIG. 2 in accordance with an embodiment of the invention.

As explained below in connection with FIGS. 4–5, the system 2 supports two exemplary kinds of modulation signal sources for the excitation voltage $v_s$. In the embodiment of FIG. 4, the multiplexer control signal 110 is generally set to a first state (e.g., false or 0) which selects the input 106 thereof. The feedback signal at the input 106 is proportional to the amplitude of the trapping RF voltage V, although the invention is also applicable to direct control of the excitation voltage $v_s$ with feedback of a corresponding proportional signal which, in turn, controls the amplitude of the trapping RF voltage V, as well as any method for controlling a ratio of the amplitude of the trapping RF voltage V to the amplitude of the excitation voltage $v_s$ in order that the ratio is generally constant.

Figure 5:
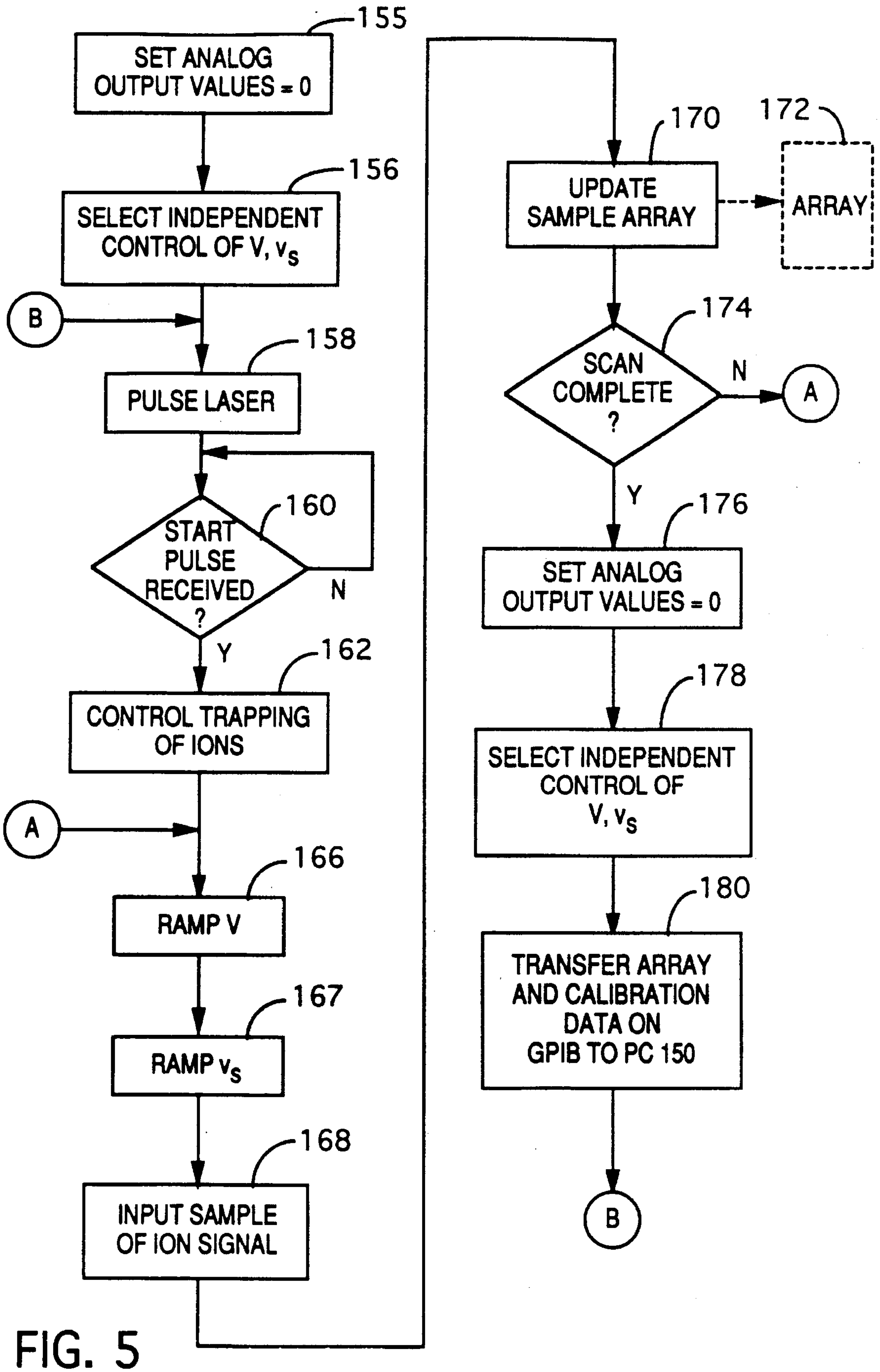
FIGS. 5 is a logic diagram showing a method of operating the ion trap mass spectrometer of FIG. 2 in accordance with another embodiment of the invention.

In the embodiment of FIG. 5, the multiplexer control signal 110 is set to a second state (e.g., true or 1) which selects the input 96 thereof. The input 96 is connected to the analog output 93A which is controlled by the PC 68. In this embodiment, the PC 68 independently controls the trapping RF voltage V and the excitation voltage $v_s$.

Also referring to FIGS. 3A–3D, the exemplary waveforms employed with the ITMS 4, respectively illustrate the laser beam pulse 40, the trapping RF voltage V, the excitation voltage $v_s$, and the detector ion signal 64 which has a plurality of mass spectral peaks 120,122 associated therewith. The waveforms of FIGS. 3A–3D are representative of a single mass analyzing scan of an overall scan sequence including ion generation, trapping, manipulating and mass analyzing. The overall scan sequence may be repeated for accumulation of the detector ion signal 64 in order to improve the spectral signal to noise ratio.

As shown in FIG. 2, each cycle is started by the PC 68 using a laser control signal 124 on line 126 from the I/O board 70 to the laser 32. In turn, the laser 32 produces the pulse 40 and the laser electronics (not shown) produce a start pulse 128 on line 130 to a delay pulse generator 132. After a predetermined delay, the pulse generator 132 provides a delayed start pulse 134 on line 136 to the I/O board 70. The delayed start pulse 134 coordinates the timing of the control sub-system 6 and the data acquisition sub-system 8, as discussed below in connection with FIGS. 4–5, in order to achieve optimal trapping efficiency for the desorbed ions.

Figures 3A, 3B, 3C, 3D:
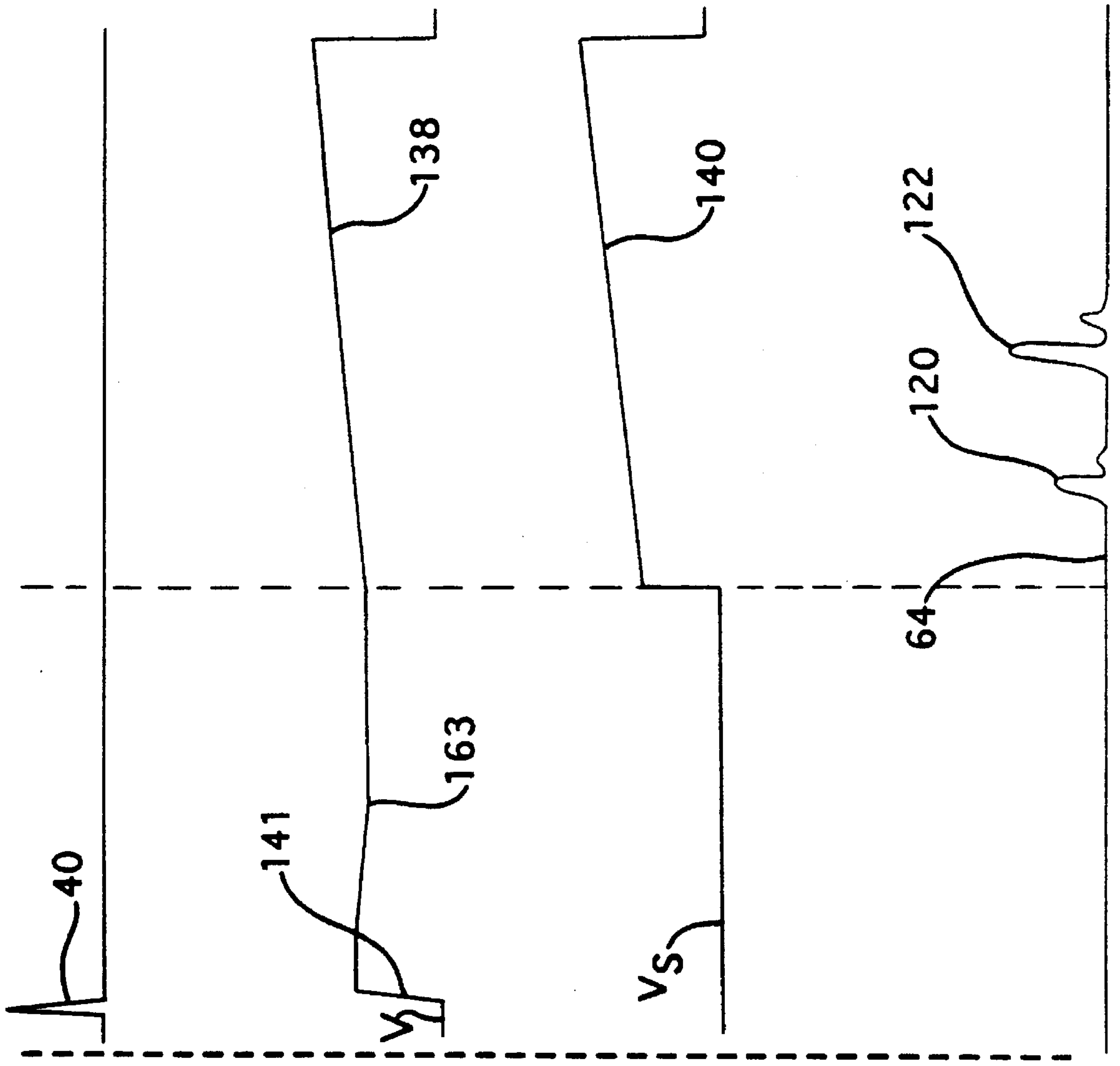
FIGS. 3A–3D are waveforms employable with the ion trap mass spectrometer of FIG. 2.

In the embodiment of FIG. 4, the PC 68 controls and ramps the trapping RF voltage V as illustrated in the right portion 138 of FIG. 3B. In the embodiment of FIG. 5, the PC 68 controls and ramps the trapping RF voltage V in the same manner and, also, controls and ramps the excitation voltage $v_s$ as illustrated in the right portion 140 of FIG. 3C. In either embodiment, ions formed by MALDI, with initial kinetic energies of the order of several electronvolts, are trapped inside the quadrupole ion trap 12 of FIG. 2 using a method of controlled eating of the trapping RF field (CGTF). See, for example, U.S. Pat. No. 5,399,857. This method includes ramping the RF field from zero to relatively high trapping values, as shown at portion 141 of FIG. 3B, during the ion flight into the center of the cavity 54 of the ITMS 4. The desorbed ions easily penetrate the weak trapping field at the initial stage of RF ramping, but are trapped with high efficiency during the last state of ramping, when they have reached the vicinity of the center of the ion trap 12.

Continuing to refer to FIG. 2, the output ion signal 64 of the detector 13 on line 66 is connected to an input 142 of a 12-bit resolution analog to digital (A/D) converter 143 of the I/O board 70. The output 144 of the A/D 143 is connected by line 146 to the PC 68. As discussed below in connection with FIGS. 4–5, the PC 68 collects the digital representation of the ion signal 64 from the line 146 and saves the acquired data with respect to the trapping RF voltage V in an array 172 (shown in FIGS. 4–5) in a memory 149 of the PC 68. The acquired data in the ion signal digital array 172 is stored in a disk drive (not shown) of the PC 68 and, then, is transferred using the GPIB interface 85 to another PC 150. It will be appreciated that while reference has been made to the exemplary PC's 68,150, other processors such as, for example, microcomputers, microprocessors, workstations, minicomputers or mainframe computers may be employed.

Figure 6:
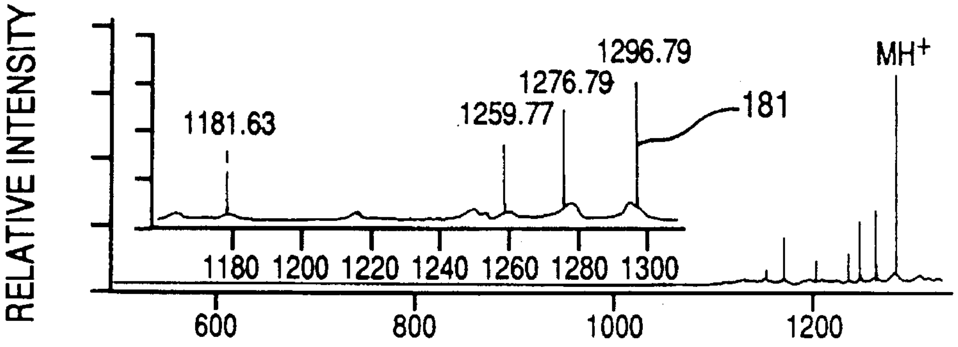
FIG. 6 is a mass spectra, including an insert showing peak structure, observed in accordance with an embodiment of the invention.
Figure 7:
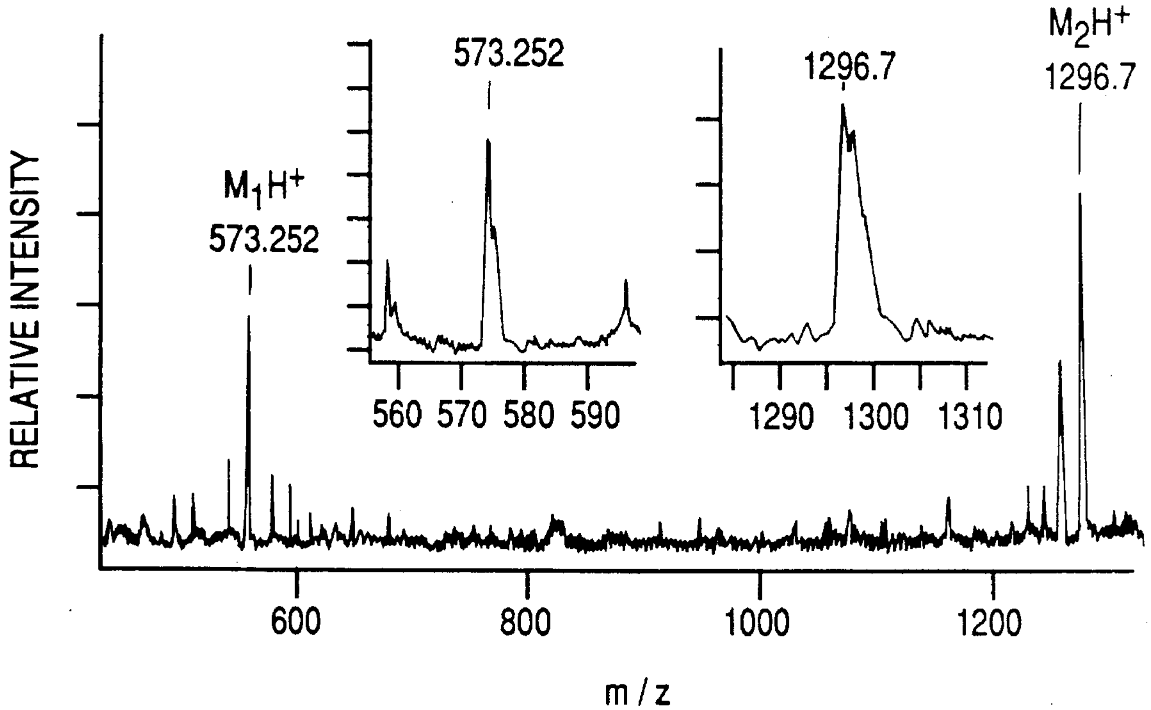
FIG. 7 is a mass spectrum, including inserts showing peak structure, observed in accordance with another embodiment of the invention.

The PC 150 includes data acquisition system software 152 which processes and plots the ion signal digital array data as illustrated in FIGS. 6 and 7. A suitable software package for this purpose is TOFWare which is marketed by ILYS Software. The PC 68 further transfers calibration information to the PC 150 over the GPIB interface 85 in order to scale the vertical axis (relative intensity) as a function of the amplitude of the ion signal 64 and the horizontal axis (m/z) as a function of the trapping RF voltage V for the mass spectra of FIGS. 6 and 7. In this manner, a sub-system 154, which consists of the PC 68, the PC 150 and the software 152, determines the mass-to-charge ratio (m/z) of at least some of the separated ions of the ITMS 4.

Referring to FIG. 4, a logic diagram for operation of the system 2 of FIG. 2 is illustrated in accordance with a preferred embodiment of the invention. The output signals 86,88 of the PC 68 are set to zero 155 and the multiplexer control signal 110 is set to the second state (e.g., true or 1) 156 in order that independent control of the voltages V, $v_s$ is initially provided. The laser control signal 124 is pulsed 158. The PC 68 waits for the delayed start pulse 134 before proceeding 160 which allows a suitable number of ions to be provided to the ITMS 4. The trapping RF voltage V is controlled 162 as illustrated in the left portion 163 of FIG. 3B. When the control step 162 is completed, the multiplexer control signal 110 is set to the first state (e.g., false or 0) 164 in order that the excitation voltage $v_s$ follows the trapping RF voltage V feedback voltage output 100. The trapping RF voltage V is controlled by ramping 166 as illustrated in the right portion 138 of FIG. 3B with the excitation voltage $v_s$ continuing to follow the trapping RF voltage V. The PC 68 inputs 168 the digital representation of the ion signal 64 and saves 170 the acquired data with respect to the trapping RF voltage V in the array 172 in the PC memory 149. The PC 68 checks whether the mass scan is completed 174 by comparing either the elapsed time of the scan or the amplitude of the trapping RF voltage V with a predetermined value stored in the PC memory 149. Steps 166,168,170,174 are repeated if the scan is not complete. On the other hand, if the scan is complete, the output signals 86,88 of the PC 68 are set to zero 176 and the multiplexer control signal 110 is set to the second state (e.g., true or 1) 178 in order to prepare for a subsequent mass scan. The array 172 is transferred to a disk drive (not shown) of the PC 68 and, then, from the disk drive to the PC 150 along with other calibration information 180. Thereafter, the next mass scan cycle is started by pulsing 158 the laser control signal 124.

The FIG. 4 embodiment of the invention controls the amplitude of the excitation voltage $v_s$ as a function of the amplitude of the trapping RF voltage V feedback voltage output 100 and employs the single voltage source of the D/A 92, which controls the trapping RF voltage V, to control both the trapping RF voltage V and the excitation voltage $v_s$.

Referring to FIG. 5, a logic diagram for operation of the system 2 in accordance with another embodiment of the invention is illustrated. FIG. 5 includes some of the same steps as discussed in connection with FIG. 4 above, with one difference being that when the control step 162 is completed, the multiplexer control signal 110 remains in the second state (e.g., true or 1) in order that the excitation voltage $v_s$ is controlled by the PC 68 independent of the trapping RF voltage V (i.e., there is no step 164). In the same manner as FIG. 4, the trapping RF voltage V is controlled by ramping 166 as illustrated in the right portion 138 of FIG. 3B. Another difference is that the excitation voltage $v_s$ is separately controlled by ramping 167 as illustrated in the right portion 140 of FIG. 3C.

In the FIG. 5 embodiment of the invention, the PC 68 determines a first value related to the amplitude of the trapping RF voltage V for the output signal 88 and determines a second value related to the amplitude of the excitation voltage $v_s$ for the output signal 86. As discussed above in connection with FIG. 2, the amplitude of the trapping RF voltage V is modulated employing the first value and the amplitude of the excitation voltage $v_s$ is modulated employing the second value, between about 0–10 volts.

The FIG. 5 embodiment of the invention employs the voltage source of the D/A 92 to control the trapping RF voltage V and the voltage source of the D/A 91 to control the excitation voltage $v_s$.

Referring again to FIGS. 1–2, Equation 1, above, describes the ion oscillation amplitude with respect to time. Ions exit the quadrupole ion trap 12 when A= $z_o$, where $z_o$ is the distance from the center of the trap 12 to the perforations 60 of the lower end-cap electrode 22. The exit time $t_e$ is shown in Equation 2:

$$z_o = \frac{F_s}{2m\omega_s\sqrt{\frac{1}{\tau^2} + a^2 t_e^2}} \quad \text{(Eq. 2)}$$

Equation 2 may be rewritten as Equation 3A:

$$z_o = \frac{F_s}{2m\omega_s\sqrt{\frac{1}{\tau^2} + k^2\left(\frac{\Delta V}{m/z}\right)^2}} \quad \text{(Eq. 3A)}$$

wherein:

$t_e = \Delta V/(dV/dt)$

V is trapping RF voltage amplitude (0-peak)

ΔV is shift of the trapping RF voltage of the observed mass $a = k(dV/dt)/(m/z)$ k is a constant Equation 3A is valid whenever:

$\omega = k_\omega q_z$ wherein:

$k_\omega$ is a constant $q_z = 4eV/m r_o^2 \Omega^2 < 0.4$

Equation 3A determines the trapping RF voltage shift ΔV in the area of its applicability. In the ideal situation where the excited ions have a free secular oscillation frequency ω which is equal to the excitation frequency $\omega_s$, the mass-to-charge ratio of the ejected ions $(m/z)_{act}$ is shown in Equation 3B and is proportionally related to the trapping RF voltage V:

$$(m/z)_{act} = C_i V/q_{ze} \quad \text{(Eq. 3B)}$$

wherein:

$C_i$ is a constant associated with the quadrupole ion trap 12

$q_{ze}$ is a known ejection value of $q_z$ as a function of $f_s(q_z = f(f_a))$ In the real case where the excited ions have a free secular oscillation frequency ω which is different from the excitation frequency $\omega_s$, an apparent mass-to-charge ratio $(m/z)_{app}$ is shown in Equation 3C:

$$(m/z)_{app} = C_i(V - \Delta V)/q_{ze} \quad \text{(Eq. 3C)}$$

Accordingly, from Equations 3B and 3C an apparent mass shift (i.e., the difference between the actual mass-to-charge ratio and the apparent mass-to-charge ratio) is shown in Equation 3D:

$$\Delta(m/z) = C_i \Delta V/q_{ze} \quad \text{(Eq. 3D)}$$

As seen from Equation 3D, the shift of the trapping RF voltage ΔV is directly related to the apparent mass shift Δ(m/z). Furthermore, the apparent mass shift Δ(m/z) is generally independent of the mass scan rate (S=d((m/z))/dt) and τ (e.g., it is independent of the nature of the colliding particles and the pressure of the helium buffer gas).

Although the apparent mass shift Δ(m/z) is constant for different masses m whenever the force $F_s$ (i.e., the excitation voltage $v_s$) is maintained at the same level, at least two data points are required for a corresponding calibration. In contrast, only a single datum point is required for calibration whenever the apparent mass shift Δ(m/z) is proportional to mass and linear dependence is derived as shown in Equations 4A, 4B and 5. The mass-to-charge ratio m/z, which is determined by the sub-system 154 of FIG. 2, is shown in Equation 4A:

$$m/z = \alpha V \quad \text{(Eq. 4A)}$$

wherein:

$m/z = C_i(V - \Delta V)/q_{ze} = [C_i V - \epsilon(m/z)]/q_{ze}$ $\epsilon = \epsilon' C_i$ $\epsilon' = \Delta V/(m/z) < 0$ is a constant during scanning $F_s/m\omega_s$ is a constant during scanning The constant α, which is utilized by the sub-system 154 of FIG. 2, is shown in Equation 4B:

$$\alpha = \frac{C_i}{q_{ze} + \epsilon} \quad \text{(Eq. 4B)}$$

wherein:

ε is an empirical constant $q_{ze}$ is an empirical constant discussed above in connection with Equation 3B The derivation of the empirical constants ε and $q_{ze}$ is discussed hereinafter.

The ratio of the apparent mass shift to the determined mass-to-charge ratio is generally constant as shown in Equation 5:

$$\frac{\Delta(m/z)}{(m/z)} = \frac{\epsilon}{q_{ze}} \quad \text{(Eq. 5)}$$

Figure 1:
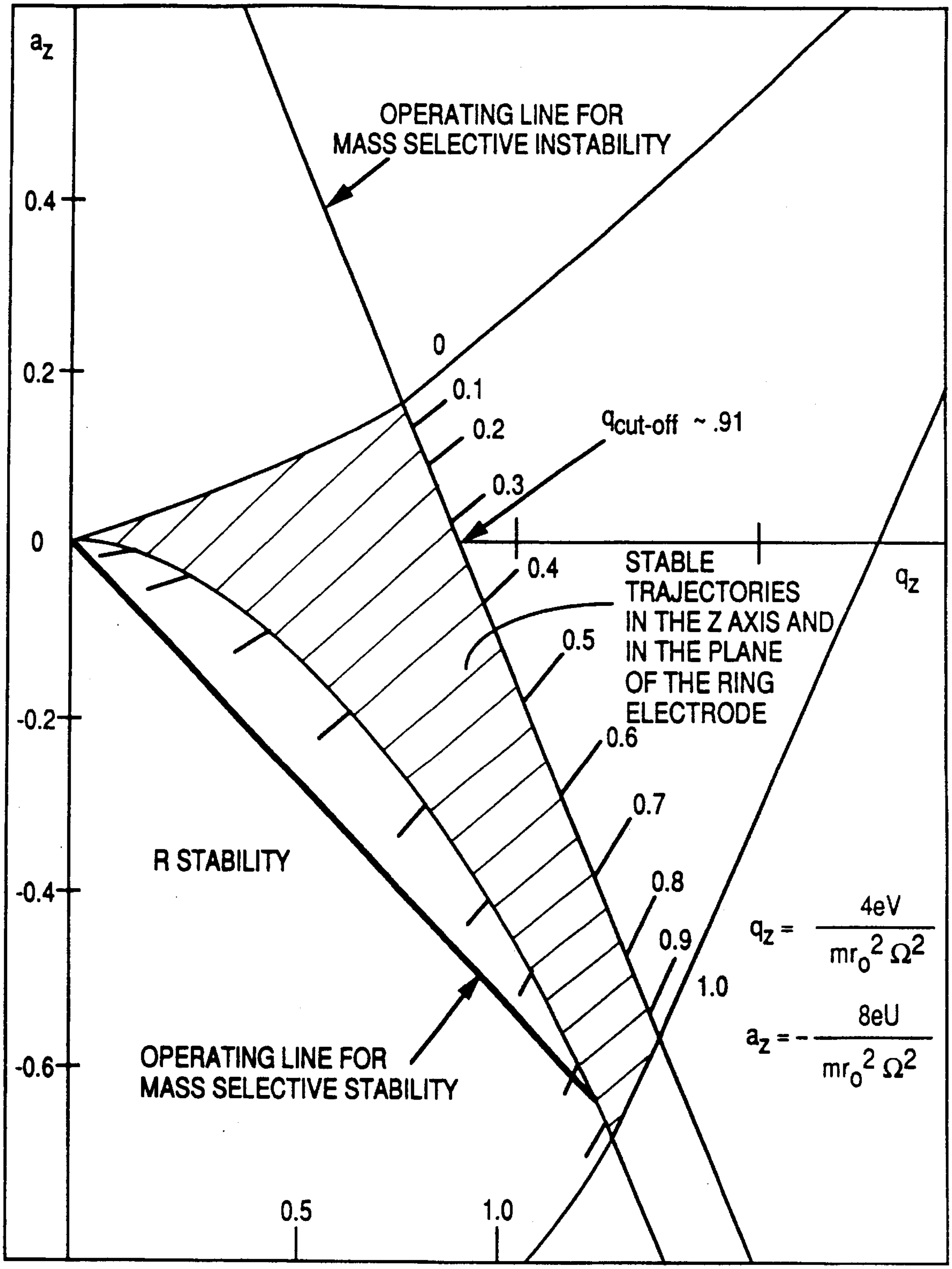
FIG. 1 PRIOR ART
FIG. 1 is a plot of a known Mathieu stability diagram for an ion trap mass spectrometer.

The linear relationship of Equations 4A–4B is valid where ions leave the quadrupole ion trap 12 at the wing of the absorption contour of FIG. 1 (i.e., whenever the secular frequency is scanned linearly with $-at >> 1/\tau$) or for relatively low secular frequency scan rates (i.e., $a^{1/2}\tau << 1$) and $$\frac{v_s}{(m/z)\omega_s} = K1 \quad \text{(Eq. 6A)}$$

or $$\frac{v_s}{(m/z)} = K2 \quad \text{(Eq. 6B)}$$

or

-continued $$v_s' = v_s \frac{(m/z)_{cal}}{(m/z)} \frac{\omega_{scal}}{\omega_s} = K3 \quad \text{(Eq. 6C)}$$

Equation 6D is derived from Equations 4A and 6B:

$$\frac{v_s}{V} = \alpha K2 = K4 \quad \text{(Eq. 6D)}$$

wherein

K1 is a constant

K2 is a constant v' is reduced excitation voltage amplitude

K3 is a constant $(m/z)_{cal}$ is a value of (m/z) of a known calibrant ion such as, for example, protonated ions of Angiotensin I (m/z=1296.69 Da)

$\omega_{scal}$ is an excitation frequency used in the calibration

K4 is a constant

As seen from Equation 6D, the amplitude of the excitation voltage $v_s$ is proportional to the amplitude of the trapping RF voltage V, with the ratio $v_s/V$ being generally constant during mass scanning. As seen from Equation 4A, a ratio of the determined mass-to-charge ratio m/z to the amplitude of the trapping RF voltage V is constant. The particular ratio K4 of Equation 6D depends upon many experimental parameters such as the frequencies of the excitation voltage $v_s$ and trapping RF voltage V, and the pressure of the buffer gas in the vacuum chamber (not shown) and the dimensions of the electrodes 14,20,22 of the ion trap 12 of FIG. 2. The ratio K4 is an adjustable value and is generally chosen to be several times greater than the minimum value required for the ejection of ions. For the exemplary ITMS 4 of FIG. 2, the pressure of helium in the vacuum chamber is about 0.5 Torr, the frequency of the excitation voltage is about 68 kHz–180 kHz and the amplitude of the excitation voltage $v_s$ is about 0–10 volts.

Referring again to FIGS. 2–5, the control sub-system 6 controls the trapping RF voltage V and the excitation voltage $v_s$ to the end-cap electrodes 20,22. In the embodiment of FIG. 5, the PC 68 controls the amplitude of the trapping RF voltage V and the amplitude of the excitation voltage $v_s$ in order to maintain the general ratio of Equation 6D therebetween. In the embodiment of FIG. 4, the PC 68 controls the amplitude of the trapping RF voltage V and the feedback circuit 99 generates the output 100, which is proportional to the amplitude of the trapping RF voltage V, for modulating the amplitude of the excitation voltage $v_s$ and, thereby, maintaining the general ratio of Equation 6D therebetween.

The PC 68 collects the array 172 of samples of the ion signal 64 and the associated samples of the trapping RF voltage V and transfers the array 172 and the constant α to the PC 150 using the GPIB interface 85. The PC 150 uses this constant α and Equation 4A to calculate the associated mass-to-charge ratio m/z values, although the invention is applicable to control and/or data acquisition sub-systems 6,8 implemented in a single PC or processor which, for example, collects the array 172 and calculates the associated mass-to-charge ratio m/z values. Preferably, the PC 68 provides a mass scan rate of between about 500 to 3000 Da/s and a reduced excitation voltage $v_s'$ of between about 4–8 volts (0-peak).

Equation 4A provides for simple linear dependence of the ratio m/z upon the trapping RF voltage V for ejected ions. This allows the use of a simple linear calibration routine, as discussed below in connection with FIG. 10, whereby a single datum point for a single calibrant mass defines a calibration line which converges near the reference point where mass and the trapping RF voltage V are both equal to zero. As seen from Equation 4B, the calibration constant to is determined by a single parameter ε with known values of $C_i$ and $q_{ze}$. In this manner, the ratio of the mass-to-charge ratio m/z to the trapping RF voltage V for each of the ejected ions is generally constant as a function of a single datum point associated with ε.

Another method for determining the calibration constants α and ε in a single exemplary calibration experiment is discussed hereinafter. The empirical value of $q_z$ is shown in Equation 7:

$$q_z = \sqrt{2}\ \beta_z - 0.1219\beta_z^2 + 0.04034\beta_z^3 - 0.8947\beta_z^4 \quad \text{(Eq. 7)}$$

wherein:

$q_z$ is less than about 0.4 to 0.5 $\beta_z = 2\omega/\Omega$

A non-linear regression method is used to derive Equation 7 from data for $v_s'$=8 volts (0-peak), with an exemplary excitation frequency $f_s$ ranging from about 68.65 kHz–180.0 kHz. In turn, the dependence $q_z = f(\beta_z)$ of Equation 7 is used to measure the ion masses at $v_s'$=6 volts (0-peak). Values of a voltage $V_c$ (shown in FIG. 2), which controls the trapping RF voltage V, and the mass-to-charge ratio m/z are recorded, with the exemplary excitation frequency $f_s$ again ranging from about 68.65 kHz–180.0 kHz. In this case, the parameter ε of Equation 4B is determined for the best linear curve fit approximation for the experimental values of $V_c$ in Equation 8:

$$\epsilon = \frac{V' C_i}{(m/z)'} - q_{ze} \quad \text{(Eq. 8)}$$

wherein:

(m/z)' is mass-to-charge ratio of a calibrant ion

V' is trapping RF Voltage V of the calibrant ion derived from $V_c$ $q_{ze}$=0.1754 ($f_s$=68.65 kHz)

$q_{ze}$=0.3504 ($f_s$=140.0 kHz)

$q_{ze}$=0.4425 ($f_s$=180.0 kHz)

$\epsilon = -2.426\ 10^{-3}$ ($v_s'$=8 volts)

$\epsilon = -1.870\ 10^{-3}$ ($v_s'$=6 volts)

The linear calibration Equations 4A–4B may be used in calibration experiments with different ions but with the same value of excitation frequency $f_s$. In this case the parameter α in Equation 4B is constant because $q_z = f(f_s)$ is constant. As discussed above, with a known value of $q_{ze}$ at a particular value of the excitation voltage frequency $f_s$, the parameter α is readily determined in a single calibration experiment for ε using a single calibrant mass.

Figure 9:
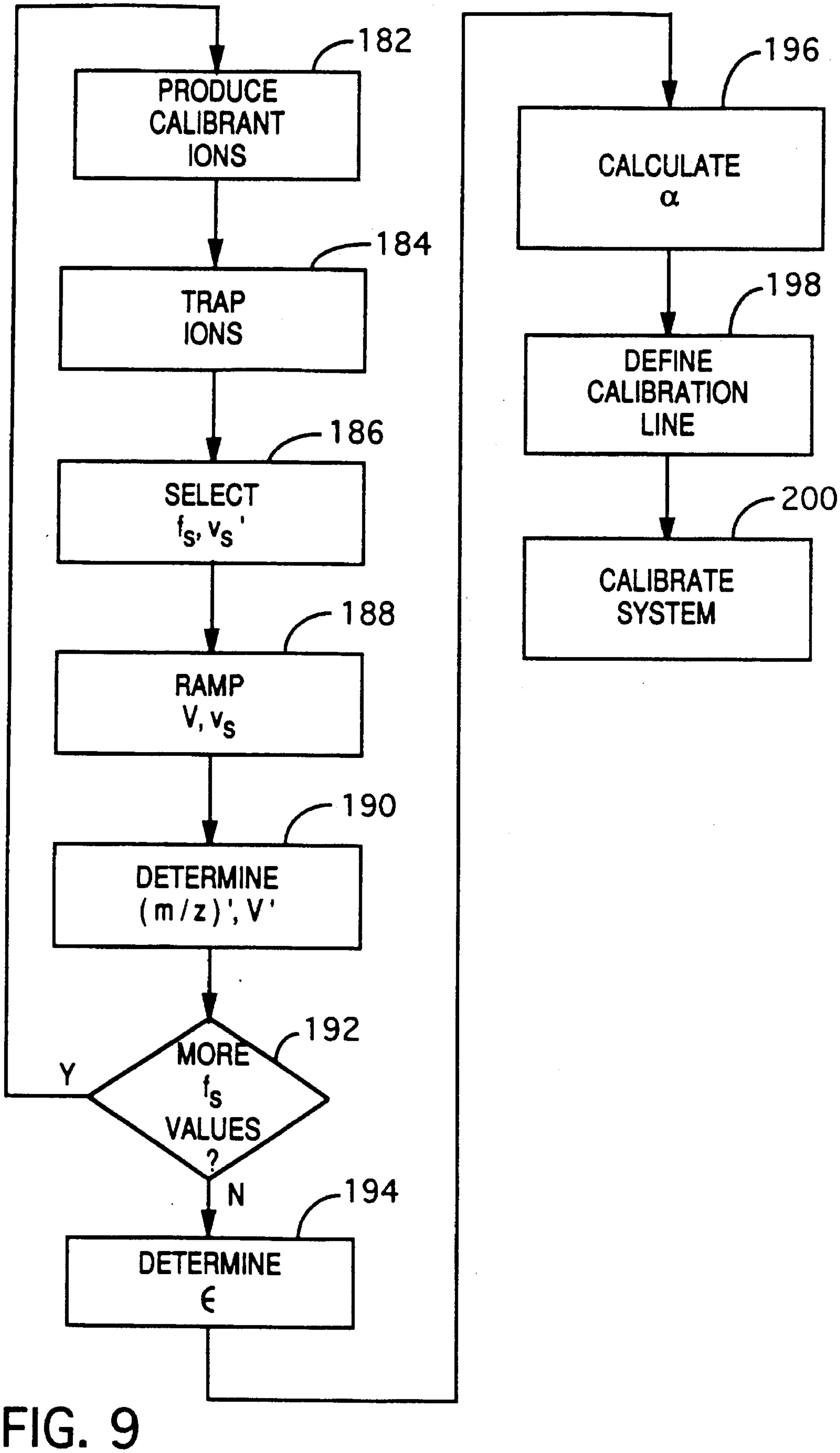
FIG. 9 is a logic diagram showing a practice of calibrating the ion trap mass spectrometer of FIG. 2.
Figure 10:
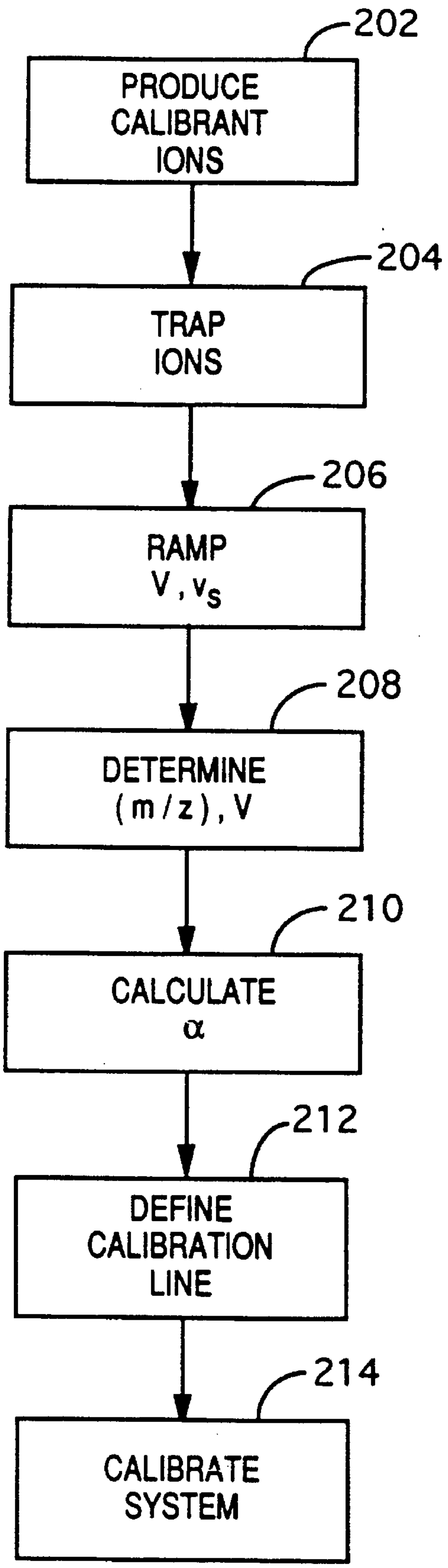
FIG. 10 is a logic diagram showing a preferred practice of calibrating the ion trap mass spectrometer of FIG. 2.

A wide variety of ions, such as, for example, molecular or fragment ions from biological molecules such as organic molecules or peptides may be used as external or internal calibrants. For the production of reliable and mainly protonated MALDI ions, peptides such as, for example, Angiotensin I (m/z=1296.69 Da) are preferably used, with the major isotopic peak of the protonated molecular ion thereof being used as an external or internal calibrant, although the calibration methods of FIGS. 9–10 are applicable to a wide range of calibrant masses such as, for example, quasimolecular ions of nucleoside α-Adenosine ($MH^+$: m/z=268.11 Da), and peptides Met-Enkephalinamide ($MH^+$: m/z=573.25 Da, $MNa^+$: m/z=595.23 Da, $MK^+$: m/z=611.20 Da); Dermorphin ($MH^+$: m/z=803.37, $MNa^+$: m/z=825.35 Da, $MK^+$: m/z=841.32 Da); Somatostatin ($MH^+$: m/z=1637.72 Da); and γ-Endorphin ($MH^+$: m/z=1858.92 Da).

Following external calibration, mass spectra measurement experiments are performed for ions having masses from about 267 to 1859 Da under conditions of constant excitation voltage frequency f, and $v_s'$. Preferably, the mass scan rate S is also constant. Each of the analyte ions generally has a mass (and a corresponding mass-to-charge ratio) which is different from the known mass (and the mass-to-charge ratio) of the exemplary calibrant ion Angiotensin I (shown in FIG. 6). The ratio of the mass-to-charge ratio to the trapping RF voltage for each of the analyte ions is generally constant, with a typical mean relative error of about 0.053 %.

Exemplary internal calibration experiments may be performed by adding a peptide, such as Angiotensin I, to an analyte peptide solution such as, for example, Met-Enkephalinamide to obtain a final solution which contains about four times more analyte molecules than those of Angiotensin I, in total about 200 pmol. The mass spectrum obtained in such experiments is discussed below in connection with FIG. 7. The mass of the protonated ion of Met-Enkephalinamide determined using Angiotensin I as an internal calibrant is obtained with an accuracy much higher than that presented by external calibration, discussed above.

The data acquisition sub-system 8 of FIG. 2 includes the I/O board 70 which receives the ion signal 64, the PC's 68,150 which are connected by the interface bus 85, and the software 152 for plotting the mass spectra. FIG. 6 illustrates a mass spectrum of relative intensity versus m/z plotted by the PC 150 of FIG. 2 for the exemplary external calibrant Angiotensin I ($MH^+$: m/z=1296.69 Da). This mass spectrum includes a measured peak 181 at m/z=1296.79 Da which is associated with the ions of the external calibrant Angiotensin I.

FIG. 7 illustrates mass spectra of relative intensity versus m/z plotted by the PC 150 of FIG. 2 for test compounds including the peptide Met-Enkephalinamide ($MH^+$: m/z=573.25 Da) and the internal calibrant Angiotensin I ($MH^+$: m/z=1296.69 Da).

The present invention is also applicable to MS/MS calibration and/or measurement experiments. For example, all masses in an MS/MS spectrum can be determined from a single known mass such as the mass of a parent ion. This method provides structural and sequence information for biomolecules.

Figure 8:
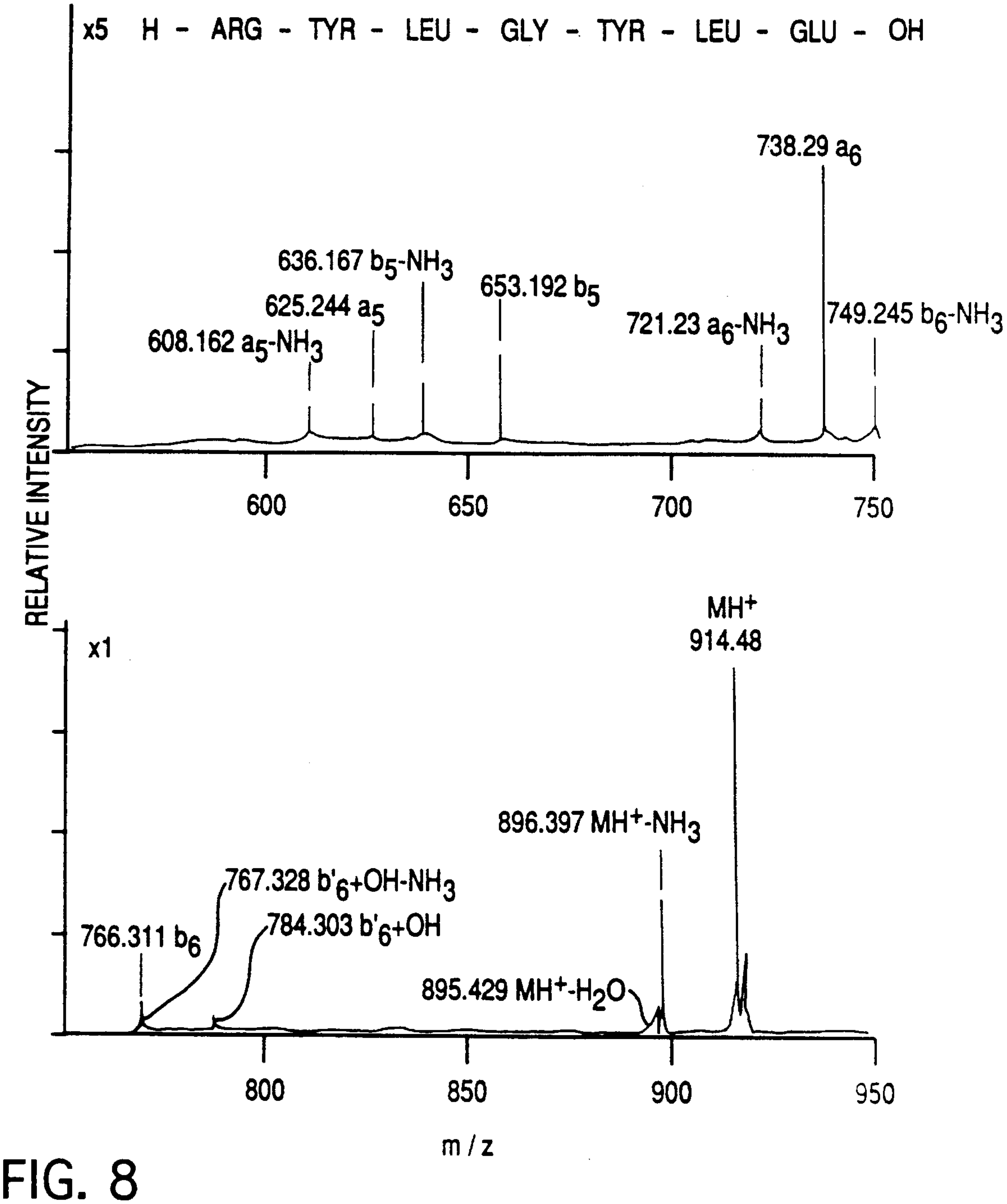
FIG. 8 is a mass spectrum, including inserts showing peak structure, in accordance with another embodiment of the invention.

An example of an MS/MS mass spectrum is illustrated in FIG. 8 which includes the second isotopic peak of the protonated ion of α-Casein Fragment 90–96 (m/z=914.48 Da) as a calibrant. Product ions are produced by collisionally induced fragmentation of the monoisotopic peak (m/z–913.48 Da) using selective excitation by application of a resonant voltage of about 0.5 volts (0-peak) between the end-cap electrodes 20,22 while leaving the other isotopic peaks intact. The mass assignment accuracy is illustrated by comparison of the masses obtained in the mass spectrum of FIG. 8 with the calculated masses shown above the mass spectrum.

The present invention is suitable for external and internal calibration techniques and is especially valuable for internal calibration routines because only a single known mass in the spectrum is required for calibration. An internal calibration can be easily performed using this method with most ionization techniques including MALDI where the simultaneous generation of analyte and calibrant ions is normally a difficult task. The methods of calibration, discussed below, are utilized with either of the two exemplary techniques.

FIG. 9 is a logic diagram showing a practice of calibrating the exemplary ion trap mass spectrometer system 2 of FIG. 2. A plurality of calibrant ions having a known mass are produced 182 and trapped 184 as discussed above in connection with FIGS. 2 and 3A–3D. Particular excitation frequency f, and reduced amplitude $v_s'$ values are selected 186. The trapping RF voltage (V) and the excitation voltage ($v_s$) are ramped 188 as discussed with FIGS. 3B–3C with the selected $f_s$ and $v_s'$ values. A mass-to-charge ratio ((m/z)') and a corresponding trapping RF voltage (V') of the calibrant ions are determined 190 as discussed above with respect to FIGS. 4–7. Steps 182–190 (even numbers only) are repeated 192 for a predetermined plurality of selected $f_s$ values. A value of ε is determined 194 by a suitable curve fitting technique using Equation 8 for known values of $C_i$ and $q_{ze}=f(f_s)$. A value of α is calculated 196 using Equation 4B, the value of α from step 194, and known values of $C_i$ and $q_{ze}=f(f_s)$. A calibration line which converges near a reference point where the mass-to-charge ratio m/z and the trapping RF voltage V are both equal to about zero is defined 198 using Equation 4A. The PC 68 is programmed 200 employing the value of α from step 196, thereby calibrating the mass spectrometer system 2 with a single calibrant mass which is associated with a single datum point.

FIG. 10 is a logic diagram showing a preferred practice of calibrating the exemplary ion trap mass spectrometer system 2 of FIG. 2. A plurality of calibrant ions having a known mass are produced 202 and trapped 204, and the trapping RF voltage (V) and the excitation voltage ($v_s$) are ramped 206 as discussed above in connection with FIGS. 2 and 3A–3C. The mass-to-charge ratio (m/z) and trapping RF voltage (V) of the calibrant ions are determined 208 and a value of α is calculated 210 therefrom using Equation 4A. A calibration line which converges near a reference point where the mass-to-charge ratio m/z and the trapping RF voltage V are both equal to about zero is defined 212 using Equation 4A. The PC 68 is programmed 214 employing the value of α from step 210, thereby calibrating the mass spectrometer system 2 with a single calibrant mass which is associated with a single datum point.

The present invention substantially increases the applications of the quadrupole ion trap for large molecule analysis in fields such as biochemistry, protein chemistry, immunology and molecular biology in order to elucidate the structures and sequences of biomolecules. In particular, accurate molecular weights of peptides using MS measurements enable the determination of the tryptic fragments from a protein in order to establish its identity from a database, to reveal point mutations or post-translational modifications, or to compare recombinant proteins with native proteins. Additionally, MS/MS measurements provide amino acid sequences that, for example, characterize the structure of peptide antigens displayed on cell surfaces for recognition by T-cells. Knowledge of such structures enables the development of vaccine strategies directed against tumor cells utilizing the body's own immune system.

Whereas particular embodiments of the present invention have been described above for purposes of illustration, it will be appreciated by those skilled in the art that numerous variations in the details may be made without departing from the invention as described in the appended claims.

We claim:

1. A method of operation of an ion trap mass spectrometer having a ring electrode and a pair of end-cap electrodes in a resonance ejection mode comprising producing ions from a plurality of atoms or molecules, trapping the ions in an ion trap;

applying a trapping voltage to said ring electrode, applying an excitation voltage to said pair of end-cap electrodes, scanning the trapping voltage in order to sequentially eject the ions from the ion trap, controlling a ratio of the amplitude of the trapping voltage to the amplitude of the excitation voltage in order that the ratio is generally constant, and determining a ratio of mass to charge of the ejected ions.

2. The method of claim 1 including sensing a feedback voltage which is proportional to the trapping voltage, and controlling the amplitude of the excitation voltage as a function of the amplitude of the feedback voltage.

3. The method of claim 1 including determining a first value related to the amplitude of the trapping voltage, determining a second value related to the amplitude of the excitation voltage, with the second value being proportional to the first value, modulating the amplitude of the trapping voltage employing the first value, and modulating the amplitude of the excitation voltage employing the second value.

4. The method of claim 3 including modulating the amplitude of the excitation voltage between about 0 to 10 volts.

5. The method of claim 1 including performing said scanning and controlling steps at least in part by a first processor, and performing said determining step at least in part by a second processor.

6. The method of claim 1 including determining the ratio of mass to charge (m/z) wherein:

$$m/z=\alpha V$$

with α being a constant, and V being the trapping voltage.

7. The method of claim 1 further comprising performing mass spectrum measurements on a plurality of ions having a known mass in order to provide a single datum point, and calibrating said mass spectrometer employing the single datum point.

8. The method of claim 7 including determining an empirical constant (κ) from said measurements, employing an instrument constant ($C_i$) of said mass spectrometer, and a variable ($q_{ze}$) which is functionally related to the frequency ($f_s$) of the excitation voltage, and calibrating the determined ratio of mass to charge (m/z) wherein:

$$m/z=\frac{C_i}{q_{ze}+\epsilon}\ V$$

and V is the trapping voltage.

9. The method of claim 8 including employing a value of $q_{ze}$ which is less than about 0.5.

10. The method of claim 8 including determining a trapping voltage (V') associated with said ions having the known mass, determining a mass-to-charge ratio ((m/z)') of said ions having the known mass, and determining the value of ϵ wherein:

$$\epsilon=\frac{V'C_i}{(m/z)'}-q_{ze}.$$

11. The method claim 8 including employing as the frequency of the excitation voltage about 68 kHz to 180 kHz.

12. The method of claim 7 including effecting said measurements by adding a peptide to an analyte peptide solution in order to provide internal calibration of said mass spectrometer.

13. The method of claim 7 including producing ions by matrix-assisted laser desorption/ionization (MALDI), and employing as said ions having the known mass said MALDI produced ions.

14. The method of claim 7 including employing, as said produced ions, ions having a plurality of masses, with at least some of the masses being different from the known mass of said ions having the known mass.

15. The method of claim 7 including employing as said ions having the known mass protonated ions having a common major isotopic peak associated with the single datum point.

16. The method of claim 15 including employing as said protonated ions Angiotensin I ions.

17. The method of claim 7 including defining a calibration line which converges near a reference point where the mass-to-charge ratio and the trapping voltage are both equal to about zero.

18. The method of claim 1 including employing a first voltage source in order to control the amplitude of the trapping voltage, and employing a second voltage source in order to control the amplitude of the excitation voltage.

19. The method of claim 1 including employing a single voltage source in order to control both the trapping voltage and the excitation voltage.

20. The method of claim 1 including ramping the amplitude of the trapping voltage, and ramping the amplitude of the excitation voltage.

21. The method of claim 1 including employing as said molecules biological molecules.

22. The method of claim 21 including selecting the biological molecules from the group consisting of α-Adenosine, Met-Enkephalinamide, Dermorphin, α-Casein Fragment 90–96, Angiotensin I, Somatostatin, and γ-Endorphin.

23. A method of calibrating an ion trap mass spectrometer for operation in a resonance ejection mode, said mass spectrometer having an excitation voltage associated therewith which excites ions of a plurality of atoms or molecules and a trapping voltage associated therewith for sequentially ejecting the ions, with the ions having a mass and a charge, said mass spectrometer determining a mass-to-charge ratio of the ejected ions, said method comprising performing mass spectrum measurements on a plurality of ions having a known mass in order to provide a single datum point associated therewith, with the single datum point being representative of a ratio of a trapping voltage associated with said ions having the known mass and a mass-to-charge ratio of said ions having the known mass, and defining a calibration line which converges near a reference point where the mass-to-charge ratio and the trapping voltage of said mass spectrometer are both equal to about zero, and calibrating said mass spectrometer employing the single datum point in order that a ratio of the amplitude of the trapping voltage to the amplitude of the excitation voltage of said mass spectrometer is generally constant.

24. The method of claim 23 further comprising sequentially ejecting ions with a trapping voltage, with the ejected ions having a plurality of masses and a plurality of mass-to-charge ratios associated therewith, with at least some of the masses being different from the known mass of said ions having the known mass, and with a ratio of the mass-to-charge ratio to the trapping voltage of each of the ejected ions being generally constant as a function of the single datum point.

25. The method of claim 24 including determining the ratio of mass to charge (m/z) wherein:

$$m/z=\alpha V$$

with $\alpha$ being a constant, and V being the trapping voltage.

26. The method of claim 25 including exciting said ions of the atoms or molecules with the excitation voltage having an excitation frequency ($f_s$), employing an instrument constant ($C_i$) of said mass spectrometer, and a variable ($q_{ze}$) which is functionally related to the excitation frequency ($f_s$), determining a value of a constant ($\epsilon$) from said measurements, and determining a value of $\alpha$ wherein:

$$\alpha=\frac{C_i}{q_{ze}+\epsilon}.$$

27. The method of claim 26 including determining a trapping voltage (V') associated with said ions having the known mass, determining a mass-to-charge ratio ((m/z)') of said ions having the known mass, and determining the value of $\epsilon$ wherein:

$$\epsilon=\frac{V'C_i}{(m/z)'}-q_{ze}.$$

28. The method of claim 27 including employing a value of $q_{ze}$ which is less than about 0.5.

29. The method of claim 23 including effecting said measurements by adding a peptide to an analyte peptide solution in order to provide internal calibration of said mass spectrometer.

30. The method of claim 23 including producing ions by matrix-assisted laser desorption/ionization (MALDI), and employing as said ions having the known mass said MALDI produced ions.

31. The method of claim 23 including determining the mass-to-charge ratio (m/z) of said ions having the known mass, determining the trapping voltage V associated with said ions having the known mass, and defining the calibration line using $$m/z=\alpha V$$

with $\alpha$ being a constant.

32. The method of claim 23 including employing as said ions having the known mass protonated ions having a common major isotopic peak associated with the single datum point.

33. The method of claim 32 including employing as said protonated ions Angiotensin I ions.

34. Ion trap mass spectrometer apparatus for operation in a resonance ejection mode comprising ionizing means for producing ions from a plurality of atoms or molecules, trapping means for trapping the produced ions, separating means for separating the trapped ions according to a ratio of mass to charge thereof, said separating means including a ring electrode and a pair of end-cap electrodes, applying means for applying a trapping voltage to the ring electrode and for applying an excitation voltage to the end-cap electrodes, with a ratio of the amplitude of the trapping voltage to the amplitude of the excitation voltage being generally constant, and determining means for determining the mass-to-charge ratio of at least some of the separated ions.

35. The apparatus of claim 34 wherein said applying means includes at least one of first ramping means for ramping the amplitude of the trapping voltage, and second ramping means for ramping the amplitude of the excitation voltage; and wherein said determining means includes means providing an ion signal corresponding to the separated ions during said ramping by said at least one of said first and second ramping means.

36. The apparatus of claim 34 wherein said applying means includes scanning means for scanning the trapping first voltage in order to sequentially eject the ions, sensing means for sensing a feedback voltage which is proportional to the trapping voltage, and controlling means for controlling the excitation voltage employing the feedback voltage in order that said ratio is generally constant.

37. The apparatus of claim 34 wherein said applying means includes first determining means for determining a first value related to the amplitude of the trapping voltage, second determining means for determining a second value related to the amplitude of the excitation voltage, with the second value being proportional to the first value, first modulating means for modulating the amplitude of the trapping voltage employing the first value, and second modulating means for modulating the amplitude of the excitation voltage employing the second value.

38. The apparatus of claim 37 wherein the excitation voltage excites the produced ions, and wherein said second modulating means modulates the amplitude of the excitation voltage between about 0 to 10 volts.

39. The apparatus of claim 34 wherein the trapping voltage is a trapping RF voltage (V) which sequentially ejects the produced ions; wherein the excitation voltage excites the produced ions, with the excitation voltage having an excitation frequency ($f_s$); and wherein the excited ions have a free oscillation frequency which is different from the excitation frequency.

40. The apparatus of claim 39 wherein said mass spectrometer includes an instrument constant ($C_i$) and a variable ($q_{ze}$) which is functionally related to the excitation frequency ($f_s$); wherein an apparent mass-to-charge ratio ($(m/z)_{app}$) is:

$$(m/z)_{app}=C_i(V-\Delta V)/q_{ze}$$

wherein an actual mass-to-charge ratio of the excited ions ($(m/z)_{act}$) is:

$$(m/z)_{act}=C_iV/q_{ze}$$

whenever the excitation frequency is about equal to the free oscillation frequency; and wherein an apparent mass shift ($\Delta(m/z)$), which is the difference between the actual mass-to-charge ratio and the apparent mass-to-charge ratio, is:

$$\Delta(m/z)=C_i\Delta V/q_{ze}.$$

41. The apparatus of claim 40 wherein said mass spectrometer has a mass scan rate, and wherein the apparent mass shift is generally independent of the mass scan rate.

42. The apparatus of claim 41 wherein the mass scan rate is between about 500 to 3000 Da/s.

43. The apparatus of claim 40 wherein said determining means determines the mass-to-charge ratio in order that a ratio of the apparent mass shift to the determined mass-to-charge ratio is generally constant.

44. The apparatus of claim 43 wherein $$\Delta(m/z)=\frac{\epsilon}{q_{ze}}(m/z)$$

and wherein $\epsilon$ and $q_{ze}$ are constants.

45. The apparatus of claim 39 wherein a ratio of the determined mass-to-charge ratio (m/z) to the amplitude of the trapping RF voltage (V) is generally constant.

46. The apparatus of claim 45 wherein $$m/z=\alpha V$$

and wherein $\alpha$ is a constant.

47. The apparatus of claim 46 wherein $C_i$ is an instrument constant of said mass spectrometer, $q_{ze}$ is a variable which is functionally related to the excitation frequency ($f_s$), $\epsilon$ is a constant, and $$\alpha=\frac{C_i}{q_{ze}+\epsilon}.$$

48. The apparatus of claim 39 wherein the excitation frequency is about 68 kHz to 180 kHz.

49. The apparatus of claim 34 wherein the excitation voltage excites the produced ions, and wherein a ratio of the excitation voltage to the determined mass-to-charge ratio is generally constant.

50. The apparatus of claim 49 wherein m/z is the determined mass-to-charge ratio, $v_s$ is the excitation voltage, and K2 is a constant; and wherein $$\frac{v_s}{(m/z)}=K2.$$

51. The apparatus of claim 34 wherein said ionizing means includes means for producing ions from biological molecules.

52. The apparatus of claim 51 wherein the biological molecules are selected from the group consisting of α-Adenosine, Met-Enkephalinamide, Dermorphin, α-Casein Fragment 90–96, Angiotensin I, Somatostatin, and γ-Endorphin.

* * * * *

UNITED STATES PATENT AND TRADEMARK OFFICE
CERTIFICATE OF CORRECTION

PATENT NO. : 5,572,025
DATED : November 5, 1996
INVENTOR(S) : Robert J. Cotter, Vladimir M. Doroshenko It is certified that error appears in the above-identified patent and that said Letters Patent is hereby corrected as shown below:

In the Abstract, line 8, "ration" should be -- ratio --.

Column 3, line 6, "$f_o$" should be -- $r_o$ --.

Column 9, line 50, "eating" should be -- gating --.

Column 13, line 11, "v'" should be -- $V_s'$ --.

Column 14, line 2, "to" should be -- $\alpha$ --.

Column 16, line 13, "$\alpha$" should be -- $\epsilon$ --.

Claim 8, column 17, line 46, "($\kappa$)" should be -- ($\epsilon$) --.

UNITED STATES PATENT AND TRADEMARK OFFICE

CERTIFICATE OF CORRECTION

PATENT NO. : 5,572,025

DATED : November 5, 1996

INVENTOR(S) : Robert J. Cotter, Vladimir M. Doroshenko

It is certified that error appears in the above-identified patent and that said Letters Patent is hereby corrected as shown below:

Claim 11, column 18, line 5, -- of -- should be inserted after "method".

Claim 36, column 20, line 37, "first" should be deleted.

Signed and Sealed this

Twenty-fifth Day of November, 1997

Attest:

BRUCE LEHMAN

*Attesting Officer* *Commissioner of Patents and Trademarks*